US008732969B2

(12) United States Patent
Erestam et al.

(10) Patent No.: US 8,732,969 B2
(45) Date of Patent: May 27, 2014

(54) LEVELING AID FOR DRILLING TOOLS

(75) Inventors: Anders Erestam, Gothenburg (SE); Ulf Petersson, Tollered (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 13/641,681

(22) PCT Filed: Apr. 16, 2010

(86) PCT No.: PCT/SE2010/050413
§ 371 (c)(1),
(2), (4) Date: Oct. 16, 2012

(87) PCT Pub. No.: WO2011/129732
PCT Pub. Date: Oct. 20, 2011

(65) Prior Publication Data
US 2013/0034395 A1 Feb. 7, 2013

(51) Int. Cl.
B23B 45/00 (2006.01)
B23B 45/14 (2006.01)

(52) U.S. Cl.
USPC .............................. 33/334; 33/366.27; 408/16

(58) Field of Classification Search
USPC ............. 33/333, 334, 366.11, 366.27; 408/16
See application file for complete search history.

(56) References Cited

U.S. PATENT DOCUMENTS

| | | | | |
|---|---|---|---|---|
| 3,846,781 A | * | 11/1974 | Smith | 116/53 |
| 4,703,315 A | | 10/1987 | Bein | |
| 4,716,534 A | * | 12/1987 | Baucom et al. | 702/154 |
| 4,973,205 A | | 11/1990 | Spaulding | |
| 5,313,713 A | * | 5/1994 | Heger et al. | 33/366.14 |
| 7,182,148 B1 | * | 2/2007 | Szieff | 173/20 |
| 7,565,748 B2 | * | 7/2009 | Li et al. | 33/345 |
| 2005/0251294 A1 | * | 11/2005 | Cerwin | 700/279 |
| 2006/0259269 A1 | * | 11/2006 | Binder | 702/155 |
| 2007/0035311 A1 | * | 2/2007 | Wuersch | 324/644 |
| 2012/0328381 A1 | * | 12/2012 | Schmidt et al. | 408/1 R |

FOREIGN PATENT DOCUMENTS

| | | | | |
|---|---|---|---|---|
| DE | 2847128 A | * | 5/1980 | ............ G09C 9/00 |
| DE | 3138543 A1 | | 4/1983 | |
| DE | 3318095 A1 | | 11/1983 | |
| DE | 3607486 A1 | | 9/1987 | |
| GB | 2389549 A | | 12/2003 | |
| JP | 2012125902 A | * | 7/2012 | ............ B23B 45/00 |
| WO | 0159405 A1 | | 8/2001 | |
| WO | WO 2007010649 A1 | * | 1/2007 | ............ B23B 45/00 |
| WO | 2011129732 A1 | | 10/2011 | |

OTHER PUBLICATIONS

International Search Report for International Application No. PCT/SE2010/050413, dated Jan. 11, 2011, 7 pages.
International Preliminary Report on Patentability for International Application No. PCT/SE2010/050413, dated Jul. 4, 2012, 8 pages.

* cited by examiner

*Primary Examiner* — R. A. Smith
(74) *Attorney, Agent, or Firm* — Novak Druce Connolly Bove + Quigg LLP

(57) ABSTRACT

According to an embodiment, a leveling aid (102) for a drilling tool (100) is disclosed. The leveling aid (102) includes a mounting means adapted to be attached to the drilling tool (100). The leveling aid (102) further includes a level detecting device adapted to provide information of inclination of the mounting means. In particular, the level detecting device is suspended on the mounting means via a resilient assembly. The resilient assembly is adapted to absorb vibrations from the drilling tool (100) to the level detecting device.

25 Claims, 2 Drawing Sheets

1

LEVELING AID FOR DRILLING TOOLS

CROSS-REFERENCE TO RELATED APPLICATIONS

This application is a national stage entry of PCT/SE2010/050413, which was filed on Apr. 16, 2010, said application is expressly incorporated herein in its entirety.

TECHNICAL FIELD

The present invention relates to drilling tools. In particular, the present system relates to a leveling aid for a drilling tool.

BACKGROUND OF THE INVENTION

Portable drilling tools are well known in the prior art. Drilling tools are commonly used to drill holes in various surfaces, such as a wall, floor ceiling and the like. The drilling tool is required to be held at various inclinations to drill the hole at a desired angle. Mostly, the drilling tool is required to drill holes substantially horizontal to a ground surface. Leveling aids for small drilling tools are known, such as a built in water-level or a corresponding electronic version. For bigger drilling tools, especially core drilling tools, this does not work during drilling because of the strong vibrations. When a large number of holes are required to be drilled in a surface at a desired inclination, a mechanical level guide is utilized to start the drilling at a correct inclination. However, when the a big drilling tool is in operation, the drilling tool vibrates a lot. If a level aid is mounted on a drilling tool with strong vibrations, the vibrations cause the level aid to vibrate as well, causing problems in its functioning and may be visibility. This can lead to drilling of holes by the drilling tool at an incorrect inclination.

In light of the foregoing, there is a need for a level aid for a drilling tool whose working is substantially unaffected by vibrations of the drilling tool in operation.

SUMMARY

In light of the aforementioned, it is an objective to solve or at least reduce the problem discussed above. In particular, the objective is to provide a leveling aid for a drilling tool whose working is substantially unaffected by vibrations of the drilling tool in operation.

The objective is achieved with a novel leveling aid for a drilling tool. The leveling aid comprises a mounting means and a level detecting device. The mounting means is adapted to be attached to the drilling tool. The level detecting device is adapted to provide information of inclination of the mounting means. The leveling aid is characterized in that the level detecting device is suspended on the mounting means via a resilient assembly. The resilient assembly is adapted to absorb vibrations from the drilling tool to the level detecting device. The resilient assembly allows the level detecting device to remain substantially undisturbed while the drilling tool is in operation. This enables the level detecting device to provide substantially accurate information about the inclination of the drilling tool.

The resilient assembly may comprise a spring assembly. A spring assembly may effectively absorb vibrations from the drilling tool when suspending the level detecting device.

The spring assembly may include at least three spring members. Thereby, the level detecting device may be connected to spring members at at least three points distributed around the edges of the level detecting device.

The at least three spring members may be coil springs.

Further, the level detecting device, in a resting state, may be free from direct contact with the mounting means. Thereby, the level detecting device may only be in connection with the mounting means via the resilient assembly. The vibrations from the drilling tool may not be transported to the level detecting device any other way.

The level detecting device may be provided with a ballast weight to provide a stable suspension between the level detecting device and the mounting means. The ballast weight may distribute load properly in the suspension formed between the resilient assembly and the level detecting device. Thereby, a more stable suspension may be provided that in a better way may isolate the level detecting device from vibrations in the drilling tool. Further, the ballast weight may be designed in a way such that spring members of a standard design may be used for providing the optimal suspension. Thereby a more cost-effective design may be provided.

The level detecting device may include an accelerometer.

The drilling tool may be a core drilling machine. The mounting means may be a housing. Further, the mounting means may be an incorporated part of the drilling tool.

The leveling aid further may include a level indicator. The level indicator may include input means configured to set a wanted inclination of the mounting means.

The level indicator further may include visual indicators configured to indicate a present inclination of the mounting means compared to the wanted inclination of the mounting means. The visual indicators may guide the operator to drill in a predefined angle by inclining the drilling tool according to the information from the visual indicators.

The level indicator further may include a sound generating means adapted to generate a sound to indicate a present inclination of the mounting means compared to the wanted inclination. The sound generating means may allow the operator to drill in the wanted angle without the need of seeing any visual indicators.

The input means may include a set button adapted to be pressed when the mounting means is held in a wanted inclination, for setting the wanted inclination of the mounting means. Using the set button, the wanted inclination may be inputted in the drilling tool, so that the drilling tool can be held in the wanted inclination for the drilling operation, and then the visual indicators and/or the sound generating means may indicate the inclination compared to that set inclination.

The input means may include a reset button adapted to be pressed to reset the wanted inclination of the mounting means to a predetermined inclination. The predetermined inclination may be an inclination substantially in parallel with a horizontal plane.

The present application also discloses a drilling tool comprising a leveling aid according to any of the the above paragraphs. The drilling tool may be a core drilling machine. The mounting means in the leveling aid may be mounted in a handle of the drilling tool.

A leveling aid for a drilling tool is provided; the leveling aid comprises a mounting means and a level detecting device. The mounting means is adapted to be attached to the drilling tool. The level detecting device is adapted to be coupled to the mounting means, and to provide information of inclination of the mounting means. The leveling aid is characterized in that the leveling aid further includes a level indicator that includes input means configured to set a wanted inclination of the mounting means.

The level indicator further may include visual indicators configured to indicate a present inclination of the mounting means compared to the wanted inclination. Thereby, the visual indicators may guide an operator to drill in a predefined angle by inclining the drilling tool according to the information from the visual indicators.

The level indicator further may include a sound generating means adapted to generate a sound that indicates a present inclination of the mounting means compared to the wanted inclination. The sound generating means may allow the operator to drill in the wanted angle without the need of seeing any visual indicators.

The input means may include a set button adapted to be pressed when the mounting means is held in a wanted inclination, for setting the wanted inclination of the mounting means. Using the set button, the wanted inclination may be inputted in the drilling tool, so that the drilling tool can be held in the wanted inclination for the drilling operation, and then the visual indicators and the sound generating means may indicate the inclination compared to that set wanted inclination.

The input means may include a reset button adapted to be pressed to reset the wanted inclination of the mounting means to a predetermined inclination. The predetermined inclination may be an inclination substantially in parallel with a horizontal plane.

The level indicator may be adapted to be mounted on the drilling tool.

A drilling tool comprising a leveling aid according to any of the paragraphs is disclosed.

The drilling tool may be a core drilling machine.

The mounting means in the leveling aid may be mounted in a handle of the drilling tool.

Other aspects, achievements and characteristic features of the invention are apparent from the appending claims and from the following description of preferred embodiments of the invention.

BRIEF DESCRIPTION OF THE DRAWINGS

In the following description of a preferred embodiment, reference will be made to the accompanying drawings, in which.

DESCRIPTION OF A PREFERRED EMBODIMENT

Figure 1:
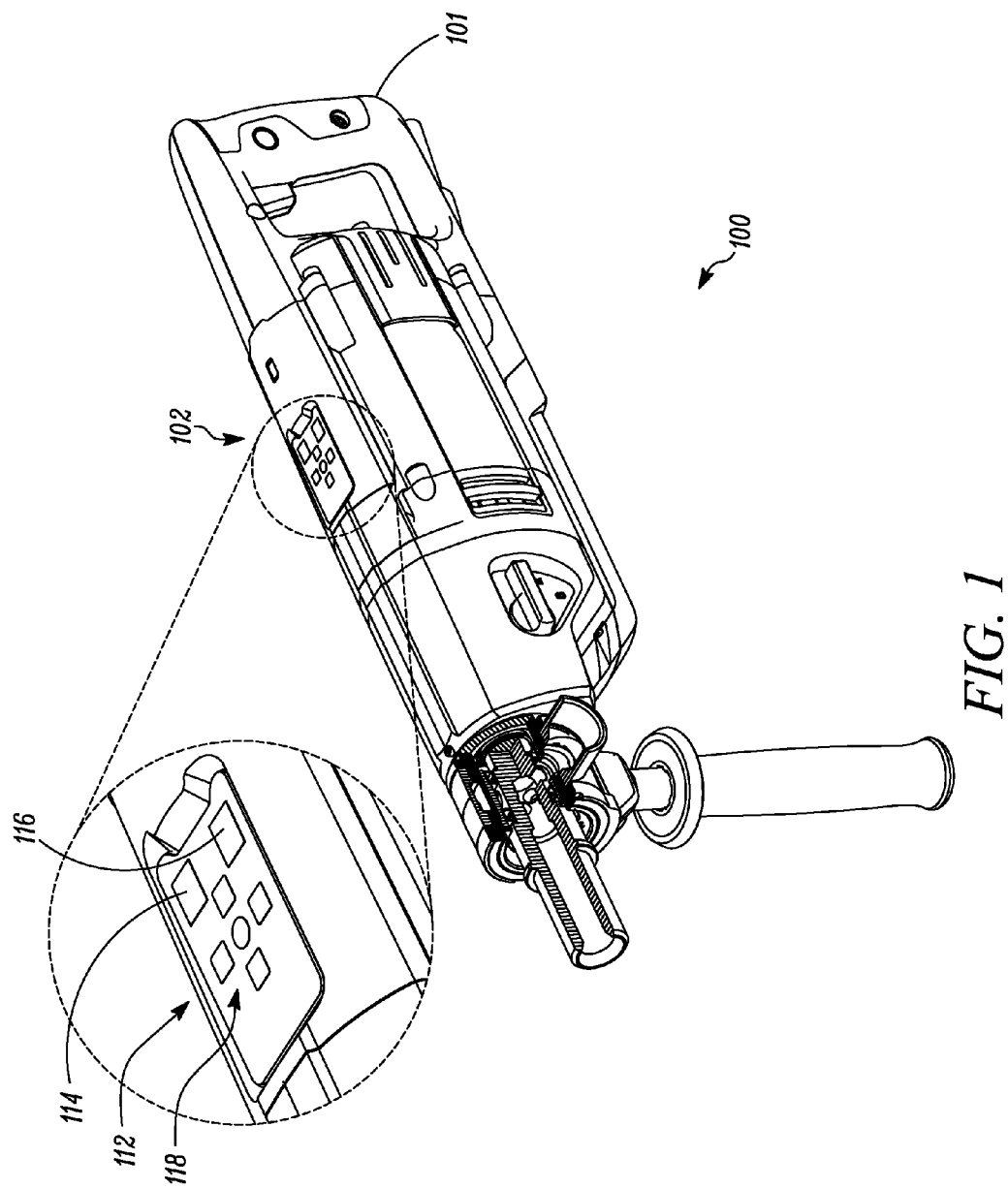
FIG. 1 shows a perspective view of a drilling tool and an enlarged view of a level indicator of a leveling aid, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

FIG. 1 shows a perspective view of a drilling tool 100 and an enlarged view of a part of a leveling aid 102, according to an embodiment of the present invention, incorporating some aspects of the present invention. Examples of the drilling tool 100 may include, for example but not limiting to, push drill, electric hammer drill, electric Rotary Drills etc. In one embodiment of the present invention, the drilling tool 100 (shown in FIG. 1) is a core drilling machine. The drilling tool 100 may include a drill bit (not shown) configured on a front portion of the drilling tool. The drill bit may be driven by a shaft to rotate. The rotation can also be combined with a reciprocate back and forth motion and accordingly a hole may be drilled on the surface. Although the drilling tool 100 described in FIG. 1 is a core drilling machine, it should be understood that the present invention may be incorporated in any suitable type of power tool or portable hand-held working machine and is not limited to use only in a drilling machine and, may be incorporated in different types of embodiments.

The drilling tool 100 may be driven by a prime mover (not shown). The prime mover may include, for example, but not limiting to, an internal combustion engine, an electric or pneumatic motor, or the like. The drilling tool 100 may have a power in the range of about 1500-2300 Watts, preferably of about 1700-1900 Watts, more preferably of about 1800 Watts. The drilling tool 100 may include a tool unit (not shown) and a tool carrier (not shown). In an embodiment of the present invention, the tool unit may be rotatably connected to the tool carrier. Further, the drilling tool 100 may also include one or more handles to permit a hand-held operation. Particularly, in an embodiment of the present invention, the drilling tool 100 may include a rear handle 101, which an operator may grip to position and hold the drilling tool 100 at a desired inclination. A detachable front handle can be used when needed.

Figure 2:
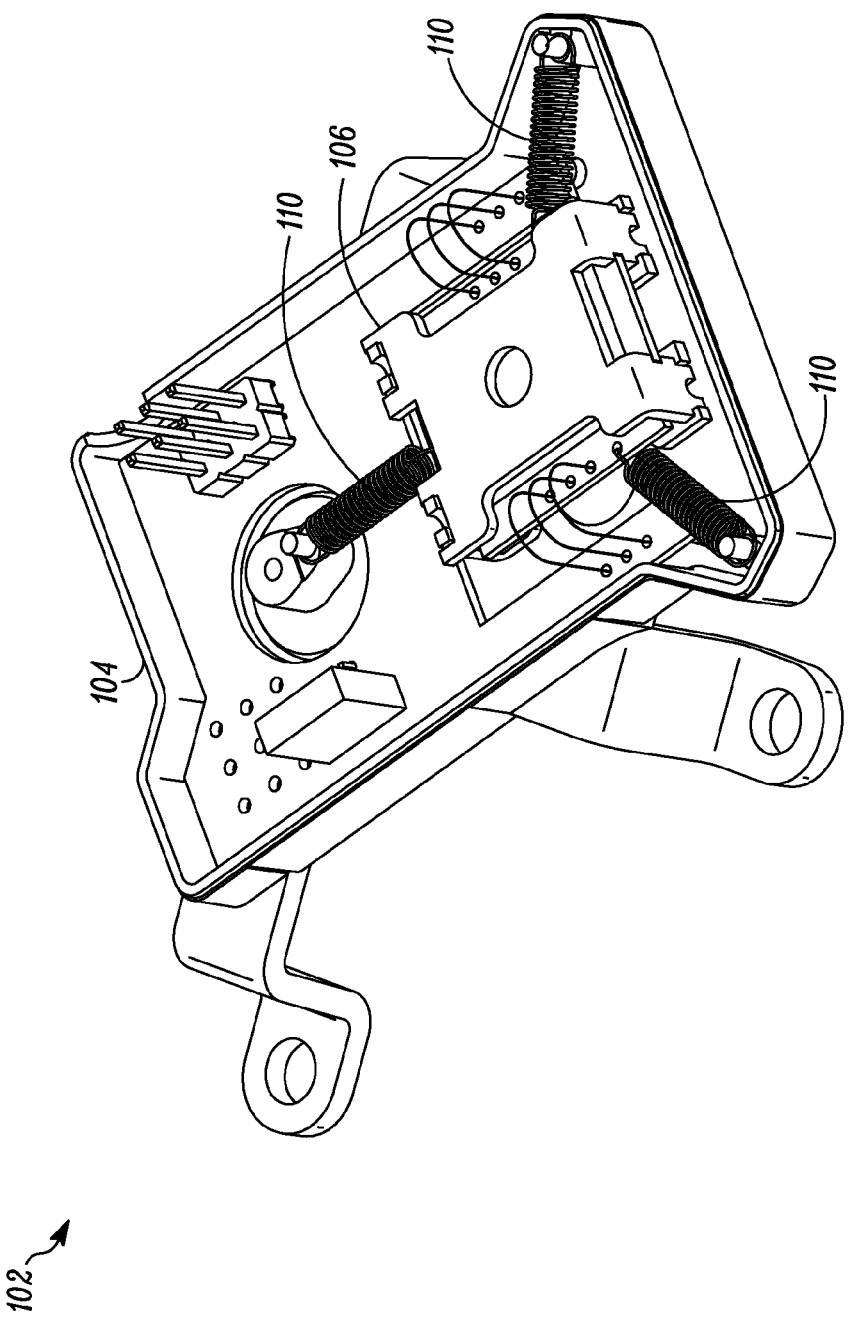
FIG. 2 shows a perspective view of a part of the leveling aid, according to an embodiment of the present invention.

FIG. 2 shows a perspective view of a part of the leveling aid 102, according to an embodiment of the present invention. The leveling aid 102 includes a mounting means 104 adapted to be attached to the drilling tool 100. In an embodiment of the present invention, the mounting means 104 is mounted in the handle 101. In an embodiment of the present invention, the mounting means 104 may be attached to the drilling tool 100 with a nut and screw arrangement. In another embodiment of the present invention, the mounting means 104 may be attached to the drilling tool using adhesive glue. In yet another embodiment of the present invention, the mounting means 104 may be an integral part of the drilling tool 100. In this case you could also say that there is no mounting means and the detecting device is mounted directly in/on the drill tool, but this would be a disadvantage. The mounting means 104 may be integrally molded with the drilling tool 100 through injection molding technique. However, it may be apparent to a person skilled in the art that various other techniques to attach the mounting means 104 on the drilling tool 100 may be utilized without departing from the spirit and scope of the invention. The mounting means 104 is configured to provide a support structure for the leveling aid 102. The mounting means 104 may be a substantially planar surface on which the leveling aid 102 may be supported on (as shown in FIG. 1). Further, the mounting means 104 may also include a covering (not shown) to encase the leveling aid 102. Accordingly, in an embodiment of the present invention, the mounting means 104 is a housing. The mounting means 104 may be composed of, but not limited to, plastic material, metallic material and the like.

As shown in FIG. 2, the leveling aid 102 includes a level detecting device 106 adapted to provide information of inclination of the mounting means 104. The level detecting device 106 may provide the information about the inclination at which the drilling tool 100 is presently held at with respect to a ground level. In an embodiment of the present invention, the level detecting device 106 includes an accelerometer. In one embodiment of the present disclosure, the accelerometer may include a strain gauge to detect the inclination strain in an object, which is detected by a foil strain element. In another embodiment of the present disclosure, the accelerometer may utilize a piezoelectric sensor to detect the inclination of the mounting means 104. In yet another embodiment of the present invention, the accelerometer may utilize Micro-Electro-Mechanical Systems (MEMS) for detecting the inclination of the mounting means 104. However it may be apparent to a person skilled in the art that various other sensors may be utilized instead of the accelerometer without departing from the spirit and scope of the invention.

Further, the information of the inclination of the mounting means 104 may be provided by the level detecting device 106 in form of analog electrical signals or digital electrical signals. Accordingly, the leveling aid 102 may include an analog to digital converter (not shown) to convert the analog electrical signal into a digital signal. Furthermore, the leveling aid 102 may include a processor device (not shown) to process the information of inclination. In an embodiment of the present invention, the processor device may be a Digital Signal Processor (DSP) device. Signals to and from the level detecting device are sent through wires. The wires should be thin and flexible in order not to disturb the suspension of the level detecting device. In one embodiment, the wires may have a diameter in the range of about 0.05-0.2 millimeters, preferably of about 0.1 millimeters.

In an embodiment of the present invention, the level detecting device 106 is suspended on the mounting means 104 via a resilient assembly. The resilient assembly is adapted to absorb vibrations from the drilling tool 100 to the level detecting device 106. The resilient assembly could be of an elostomeric material (e.g. rubber) or of metal. The resilient assembly preferably includes a number of spring members, e.g. one or two leaf springs which are flat or preferably corrugated. Most preferably at least three spring members 110 are used as shown in FIG. 2. The spring assembly may comprise any resilient member, such as a rubber member.

The spring members 110 may be specifically adapted to absorb vibrations within the range of about 5-40 Hertz (Hz), preferably of 10-30 Hz, and more preferably of 12-20 Hertz, and most preferably of about 16 Hertz.

The spring members 110 may be coil springs having an outer diameter in the range of about 1-5 millimeter, preferably of about 3 millimeters. The spring members 110 may have threads of a thickness in the range of about 0.1-0.4 millimeters, preferably of about 0.2 millimeters. The spring members 110 may in a resting state have a length in the range of about 5-20 millimeters, preferably of about 8-15 millimeters, more preferably of about 10 millimeters. The spring members 110 may have a spring constant in the range of about 0.02-0.05 Newton/millimeter, preferably of about 0.03-0.04 Newton/millimeter, more preferably of about 0.035 Newton/millimeter.

The spring members 110 have one end attached to the level detecting device 106 and the other end to the mounting means 104. In an embodiment of the present invention, the ends of the spring members 110 are attached to the level detecting device 106 and the mounting means 104 using welding technique. In another embodiment, the ends of the spring members 110 are attached to the level detecting device 106 and the mounting means 104 using adhesive glue. However, other techniques may be utilized without departing from the spirit and scope of the invention. The spring members 110 are composed of flexible material capable of expanding and contracting based on force applied on the ends of the spring members 110. Particularly, when the drilling tool 100 is in operation, the mounting means 104 also experiences vibrations and shocks. This may cause the mounting means 104 to reciprocate to-and-from, sway side-to-side and swing up-and-down. But, as the level detecting device 106 is mounted on the mounting means 104 via spring members 110, the spring members 110 expand and contract due to these forces. The expansion and contraction of the spring members 110 reduces the degree of vibrations and shock transferred to the level detecting device 106. In an embodiment of the present invention, the spring members 110 are coil springs. However, it may be apparent to a person ordinarily skilled in the art that various other springs may be utilized as the spring members 110 without departing from the spirit and scope of the invention.

Further, when the drilling tool 100 is not in operation, the level detecting device 106 is in a resting state and is free from direct contact with the mounting means 104. Particularly, the spring members 110 suspend the level detecting device 106 such that it is substantially hanging with a predefined clearance present between the mounting means 104 and the level detecting device 106. The predefined clearance allows the level detecting device 106 to swing up and down when the drilling tool 100 is operating. Avoiding contact of the level detecting device 106 with the mounting means 104 allows functioning properly without getting disturbed by shocks and vibrations caused due to operation of the drilling tool 100. However, if the vibrations generated when the drilling tool 100 is in operation exceed a predefined threshold, the level detecting device 106 may get in contact with the mounting means 104.

Furthermore, in case the level detecting device 106 is lightweight it may require thin springs to provide the required suspension between the level detecting device 106 and the mounting means 104. Alternatively, a ballast weight is configured to damp the suspension by adding additional weight to the level detecting device 106. This enables use of thicker spring members 110 to provide the required suspension to the level detecting device 106. The ballast weight may be designed in order to make it suitable with spring members 110 of a standard design and dimension, providing a more cost-effective solution. In an embodiment of the present invention, the ballast weight may be an integral part of the level detecting device 106. The ballast weight may be designed such that the complete weight for the level detecting device 106 including the ballast weight, but excluding the wires, is in the range of about 2-5 grams, preferably of about 3-4 grams, more preferably of about 3.7 grams. The ballast weight may further be designed such that the complete weight of the level detecting device 106 including the ballast weight and the wires is in the range of about 4-8 grams, preferably of about 5-7 grams, more preferably of about 6 grams.

As shown in FIG. 1, the leveling aid 102 may include a level indicator 112. In an embodiment of the present invention, the level indicator 112 is attached on a top portion of the drilling tool 100 (as shown in FIG. 1) so that it is conveniently visible to an operator of the drilling tool 100. In another embodiment of the present invention, the level indicator 112 is integrally molded with the drilling tool 100. The level indicator 112 provides an interface for the operator of the drilling tool 100 to input and receive information about the inclination of the drilling tool 100. The level indicator 112 may include input means 114 and 116 configured to set a wanted inclination of the mounting means 104. A wanted inclination may be a desired inclination at which the holes are required to be drilled by the drilling tool 100. Particularly, in an embodiment of the present invention, a set button 114 is adapted to be pressed when the mounting means 104 is held in the wanted inclination, for setting the wanted inclination of the mounting means 104. More particularly, while setting the wanted inclination, the drilling tool 100 is positioned at the desired inclination which is required to be set as the wanted inclination. In an embodiment of the present invention, when the set button 114 is pressed, the inclination at which the drilling tool 100 is held at is stored in a memory (not shown) of the DSP.

Further, the input means 116 includes a reset button 116 which is adapted to be pressed to reset the wanted inclination of the mounting means 104 to a predetermined inclination. In an embodiment of the present invention, when the reset button 116 is pressed, the wanted inclination stored in the memory (not shown) of the DSP is removed. This enables a new wanted inclination to be stored in the memory for future use of the drilling tool 100. The predetermined inclination may be an inclination substantially in parallel to a horizontal plane.

As shown in FIG. 1, the level indicator 112 further includes visual indicators 118 configured to indicate a present inclination of the mounting means 104 compared to the wanted inclination of the mounting means 104. Particularly, when the drilling tool 100 is in operation, the wanted inclination stored in the memory is compared with present inclination of the mounting means 104 by the DSP. Accordingly, an error signal is generated by the DSP providing information about the inclination the drilling tool 100 should be moved to in order to be positioned at the wanted inclination. For example, if the drilling tool 100 is currently below the wanted inclination, a positive error signal may be generated by the DSP. Accordingly, a visual indication depicting that the drilling tool 100 should be inclined upwardly to reach the wanted inclination is illuminated. Conversely, if the drilling tool 100 is currently above the wanted inclination, a negative error signal may be generated by the DSP. Accordingly, a visual indication depicting that the drilling tool 100 should be inclined downwards to reach the wanted inclination is illuminated. In an embodiment of the present invention, the visual indicators 118 may flash instead of constant illumination to draw operator's attention. Upon receiving the visual indication, the operator may adjust the drilling tool 100 to the wanted inclination. In an embodiment of the present invention, the visual indicators may generate a visual indication to the operator when the drilling tool 100 is positioned at the wanted inclination. The visual indicators 118 may comprise four direction indicators for indicating that the drilling tool should be inclined in any of the four directions. The visual indicators 118 may further comprise a center indicator for indicating that the present inclination is equal to the wanted inclination.

In an embodiment of the present invention, examples of the visual indicators 118 include, but not limited to Light-Emitting Diode (LED), incandescent light bulb, Liquid crystal display (LCD) and the like. However, it may be apparent to a person skilled in the art that various other visual indicators may be utilized without departing from the spirit and scope of the invention.

In another embodiment of the present invention, the level indicator 112 may include a sound generating means (not shown) adapted to generate a sound to indicate the present inclination of the mounting means 104 compared to the wanted inclination. For example, if the drilling tool 100 is currently below the wanted inclination, a positive error signal may be generated by the DSP. Accordingly, an audio output depicting that the drilling tool 100 should be inclined upwardly to reach the wanted inclination is sounded. Conversely, if the drilling tool 100 is currently above the wanted inclination, a negative error signal may be generated by the DSP. Accordingly, an audio output depicting that the drilling tool 100 should be inclined downwards to reach the wanted inclination is sounded. Upon receiving the audio output, the operator may adjust the drilling tool 100 to the wanted inclination. In an embodiment of the present invention, the sound generating means may produce an audio output when the drilling tool 100 is positioned at the wanted inclination.

Further, the level indicator 112 may include an interface circuitry (not shown) coupled with the DSP to interface the sound generating means, the visual indicators 118 and the input means (114, 116) with DSP. For example, the DSP may include a LCD driver circuitry and a speaker driver circuitry coupled therewith.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A leveling aid for a drilling tool, the leveling aid comprising:
   a mounting means adapted to be attached to the drilling tool; and
   a level detecting device adapted to provide information of inclination of the mounting means,
   the level detecting device is suspended on the mounting means via a resilient assembly, the resilient assembly is adapted to absorb vibrations from the drilling tool to the level detecting device, and the resilient assembly is a spring assembly comprising at least three spring members.

2. The leveling aid according to claim 1, wherein the at least three spring members are coil springs.

3. The leveling aid according to claim 1, wherein the level detecting device, in a resting state, is free from direct contact with the mounting means.

4. The leveling aid according to claim 1, wherein the level detecting device is provided with a ballast weight.

5. The leveling aid according to claim 1, wherein the level detecting device comprises an accelerometer.

6. The leveling aid according to claim 1, wherein the drilling tool is a core drilling machine.

7. The leveling aid according to claim 1, wherein the mounting means is a housing.

8. The leveling aid according to claim 1, wherein the leveling aid further comprises a level indicator, the level indicator comprising input means configured to set a wanted inclination of the mounting means.

9. The leveling aid according to claim 8, wherein the level indicator further comprises a sound generating means adapted to generate a sound to indicate a present inclination of the mounting means compared to the wanted inclination.

10. The leveling aid according to claim 8, wherein the input means comprises a set button adapted to be pressed when the mounting means is held in a wanted inclination, for setting the wanted inclination of the mounting means.

11. The leveling aid according to claim 8, wherein the input means comprises a reset button adapted to be pressed to reset the wanted inclination of the mounting means to a predetermined inclination.

12. The leveling aid according to claim 1, wherein the leveling aid further comprises a level indicator, which level indicator further comprises visual indicators configured to indicate a present inclination of the mounting means compared to a wanted inclination of the mounting means.

13. A drilling tool comprising a leveling aid according to claim 1.

14. The drilling tool according to claim 13, wherein the drilling tool is a core drilling machine.

15. The drilling tool according to claim 13, wherein the mounting means in the leveling aid is mounted in a handle of the drilling tool.

16. A leveling aid for a drilling tool, the leveling aid comprising:
- a mounting means adapted to be attached to the drilling tool;
- a level detecting device adapted to be coupled to the mounting means, and to provide information of inclination of the mounting means; and
- the leveling aid further comprises a level indicator comprising input means configured to set a wanted inclination of the mounting means, and the level indicator further comprises visual indicators, and the wanted inclination set is compared with a present inclination of the mounting means, and an error signal is generated providing information about the inclination the drilling tool should be moved to in order to be positioned at the wanted inclination, and this is indicated by the visual indicators, if the drilling tool is currently below the wanted inclination a visual indication depicting that the drilling tool should be inclined upwardly to reach the wanted inclination is illuminated.

17. The leveling aid according to claim 16, wherein the visual indicators comprise four direction indicators for indicating that the drilling tool should be inclined in any of the four directions.

18. The leveling aid according to claim 16, wherein the level indicator further comprises a sound generating means adapted to generate a sound that indicates a present inclination of the mounting means compared to the wanted inclination.

19. The leveling aid according to claim 16, wherein the input means comprises a set button adapted to be pressed when the mounting means is held in a wanted inclination, for setting the wanted inclination of the mounting means.

20. The leveling aid according to claim 16, wherein the input means comprises a reset button adapted to be pressed to reset the wanted inclination of the mounting means to a predetermined inclination.

21. The leveling aid according to claims 16, wherein the level indicator is adapted to be mounted on the drilling tool.

22. A drilling tool comprising a leveling aid according to claim 16.

23. The drilling tool according to claim 22, wherein the drilling tool is a core drilling machine.

24. The drilling tool according to claim 22, wherein the mounting means in the leveling aid is mounted in a handle of the drilling tool.

25. A leveling aid for a core drilling machine, the leveling aid comprising:
- a mounting device adapted to be attached to the drilling tool; and
- a level detecting device adapted to provide information of inclination of the mounting device,
- the level detecting device is suspended on the mounting device via a resilient assembly, the resilient assembly is adapted to absorb vibrations from the core drilling machine to the level detecting device, and the resilient assembly is a spring assembly comprising at least three spring members.

* * * * *